United States Patent

[11] 3,584,859

| [72] | Inventor | Robert E. Siron |
| | | Huntsville, Ala. |
| [21] | Appl. No. | 788,824 |
| [22] | Filed | Jan. 3, 1969 |
| [45] | Patented | June 15, 1971 |
| [73] | Assignee | The United States of America as represented by the Secretary of the Army |

[54] VACUUM-OPERATED SPECIMEN-HOLDING DEVICE
3 Claims, 3 Drawing Figs.

[52] U.S. Cl. ..................................................... 269/21, 269/280
[51] Int. Cl. ........................................................ B25b 11/00
[50] Field of Search .......................................... 269/7, 21, 282, 280; 279/3; 51/235

[56] References Cited
UNITED STATES PATENTS

| 2,876,667 | 3/1959 | Smith | 269/282X |
| 3,004,766 | 10/1961 | Bryant | 51/235X |
| 3,294,392 | 12/1966 | Dunham | 269/21 |
| 3,309,254 | 3/1967 | Rowe | 269/21 |
| 3,321,961 | 5/1967 | LeBouef | 269/21 |

*Primary Examiner*—Andrew R. Juhasz
*Assistant Examiner*—Donald D. Evenson
*Attorneys*—Harry M. Saragovitz, Edward J. Kelly, Herbert Berl and Harold W. Hilton ABSTRACT: A vacuum-operated device for holding test specimens for cutting or shaping purposes. The device includes a rectangular base portion having a chamber with an open upper side. An adapter plate is parallel with and fixed to the upper side and has a recess formed around the inner edge thereof to receive a perforated holding plate. The holding plate can be any one of a large quantity of plates that mate with the recess and provide a perforated geometric closure for the open side. When a test specimen having the same shape as the perforated closure is placed thereon, a vacuum is applied to the enclosure of the device and the resultant force on the specimen holds it in place.

PATENTED JUN 15 1971

3,584,859

Robert E. Siron,
INVENTOR.

Harry M. Saregowitz
Edward J. Kelly
Hubert Berl
Harold W. Hilton

BY

VACUUM-OPERATED SPECIMEN-HOLDING DEVICE

BACKGROUND OF THE INVENTION

The use of vacuum vises in machining low modulus or detonable materials such as solid propellants is not uncommon. Such materials cannot be held by conventional methods, such as a clamp vise, because of the resultant distortion in the workpiece and for safety reasons.

Alignment is a major problem in the preparation of test specimens having prescribed geometrical configurations where it is extremely important that the contoured surfaces on opposite sides be as nearly perfect in symmetry as possible. Extreme difficulty is encountered using prior methods, and the results are usually less than satisfactory. Precision is primarily dependent upon the capabilities and judgment of the operator, but is also a function of equipment limitations. Generally, the contoured surfaces of a specimen prove to be nonsymmetrical even though considerable time and effort is expended in attempts to level the plates and to align each plate with the cutter in exactly the same relative position as the first plate.

The previous vacuum vises included perforated holding plates which clamped on to a vacuum reservoir fastened to a milling machine table. The first specimen cut, a contoured cut, was made in the upper surface of a rectangular parallelopiped propellant workpiece while it was held in place on a flat-surfaced perforated holding plate. For the second cut, the flat-surfaced perforated plate was replaced with one having a contoured surface which fit the first cut surface. It was impossible of course to clamp the second plate in exactly the same position as the first and to apply exactly the same clamping force thereto. Consequently much time was spent trying to align the second plate exactly in relation to the cutting tool, to avoid lateral misalignment of the contour cuts, and to clamp it so it would be perfectly level, attempting to avoid nonparallel surfaces.

SUMMARY OF THE INVENTION

In solving the prior-art problems, a vacuum reservoir base is modified to accommodate cartridge-loaded perforated holding plates. A holding plate of any surface configuration, of the correct dimensions, is easily dropped into place without affecting the relative alignment between the cutting tool and the various plates because the alignment between the base and the cutting tool is fixed. Different holding plates drop into place in the same cavity and rest on the same fixed surface, therefore, the perforated holding surface is always level. As a result, the machined surfaces of a workpiece that has been cut while held on two or more different perforated plates in this device are parallel and symmetrically aligned. A minimum of time and effort is required to make the required changes between cuts.

Because of the variety of plates which can be inserted in the vacuum base cavity almost any configuration of contoured specimen which is symmetrical about one or two axes can be produced using this device. When a rectangular parallelopiped specimen has identical contours cut on opposing parallel sides, the cuts of the specimen will be parallel to and symmetrical about a longitudinal axis passing through the center of the specimen. Normally the contour of each one of four quadrants of the plane of a holding plate is symmetrical to the other quadrants. That is each quadrant is a mirror reflection of another quadrant. Under these conditions the specimen is also symmetrical about any axis perpendicular to the longitudinal axis and passing through the center of the specimen perpendicular to the face thereof.

DESCRIPTION OF THE PREFERRED EMBODIMENT

Figure 1:
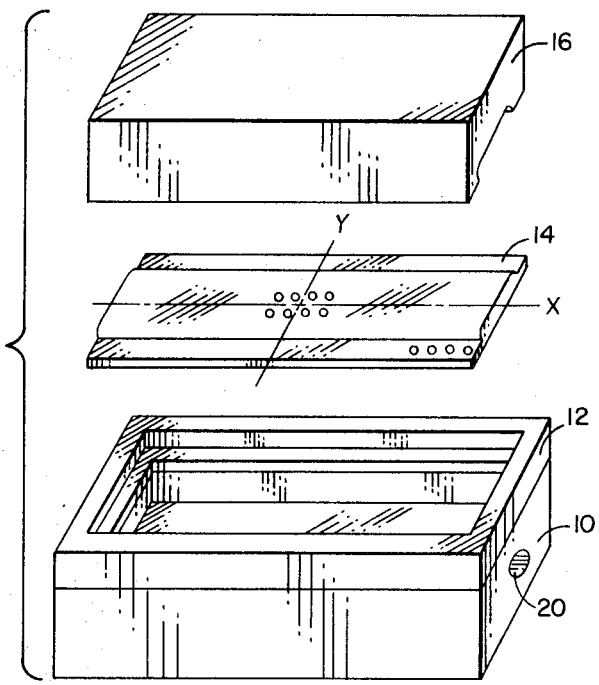
FIG. 1 is a partially exploded view of a preferred embodiment in the invention.

Referring now to the drawings wherein like numerals represent like parts in all figures, and wherein there is disclosed a preferred embodiment of the present invention. As disclosed in FIG. 1, a vacuum reservoir base 10 is attached to a suitable cutting device such as a milling machine (not shown). An adapter plate 12 is secured to base 10, and care is taken to insure that this arrangement is level and properly aligned with the cutting tool. Adapter plate 12 can also be an integral part of base member 10. A perforated holding plate 14 is inserted into adapter plate 12 prior to the cutting operation. Plate 14 is shown lying in a plane arbitrarily defined by the coordinates X-Y, which may be considered when observing a particular portion of the plate for symmetry with an adjacent quadrant portion. Coordinates X-Y are mutually perpendicular axes intersecting at the center of plate 14 and forming four quadrants. A workpiece 16 to be machined is positioned on the holding plate 14. An opening 20 in base 10 is provided for attaching means for pulling a vacuum on the assembly, thus holding workpiece 16 in place. The workpiece surface is then machined as desired.

Figure 2:
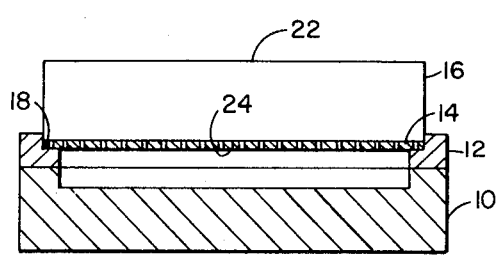
FIG. 2 is a sectional view of an embodiment of the invention with a sample workpiece attached thereto.

FIG. 2 discloses a flat perforated plate 14 inserted into the recess of adapter plate 12. Initially the propellant workpiece 16 is flat on each side thereof and is placed adjacent holding plate 14. After the vacuum is pulled the face 22 is machined to the desired shape. If only two sides are to be machined, the vacuum is released, the sample 16 is removed, and plate 14 is replaced with another perforated holding plate that has the same contour as that cut into face 22. Sample 16 is them inverted and placed on the new holding plate with face 22 adjacent the new plate 14. A vacuum is pulled on the chamber and face 24 is machined to the desired shape. Symmetry is assured because each plate 14, regardless of contour, is designed to fit into a recessed area 18 of adapter plate 12. Any suitable means such as guide pins or grooves may be used in particular cases to insure that perforated plates 14 are aligned in the same relative position within adapter plate 12 during successive operations. This need could arise when the contour of each one of four quadrants of the plane of a particular plate 14 is not symmetrical to the other quadrants. Thus a misalignment of 90° (for a system using square plates only) or 180° of a second or additional plate would be prevented by guides.

Figure 3:
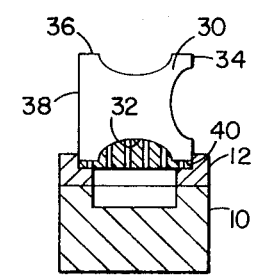
FIG. 3 is a sectional cutaway view of the invention with a sample showing various stages of progress.

FIG. 3 discloses a specimen 30 that has been machined on faces 32, 34, and 36. Initially a flat holding plate is employed and faces 32 and 34 are machined. The flat plate is removed and replaced by plate 40, which has the same contour and size as the machined faces 32 and 34. Placing faces 32 and 34 down, the remaining faces are then machined to again provide a symmetrical finished product.

Although a particular embodiment and form of this invention have been illustrated, it is obvious to those skilled in the art that modifications may be made without departing from the scope and spirit of the foregoing disclosure. For example, the same device may be readily employed while cutting or drilling a symmetrical path through a propellant sample being held thereon, with the drilling path or paths parallel to the plane of holding face 14. Therefore, it is understood that the invention is limited only by claims appended hereto.

I claim:

1. A vacuum-operated, specimen-holding device comprising a housing having an opening in the upper side thereof; an adapter plate fixedly secured to said housing on the upper side thereof adjacent to said opening, said plate having an opening therein that is coincident with said open side, and further being formed with a recessed flange around the periphery of said adapter opening; a perforated holding plate matingly received in said recess in contact with said inner periphery and providing a closure for said open side, said holding plate being selected from a plurality of perforated holding plates, each one being adapted for mating with said recessed flange; each of said perforated plates having a nonplanar shape for enclosing said opening; and said housing being connected to a vacuum source for holding specimen on the perforated plate when the specimen has the same nonplanar shape adjacent said plate.

2. A vacuum-operated, specimen holding device as set forth in claim 1 wherein said nonplanar shape of said perforated holding plate is comprised of at quadrants, at least one of said quadrants being symmetrical and parallel with an adjacent quadrant.

3. A vacuum-operated holding device comprising a base member having a chamber with an open upper side; an adapter plate parallel with and secured to said upper side having an opening therethrough and having a recess formed around the inner periphery thereof; a perforated holding plate matingly received in said recess in contact with said inner periphery and providing a closure for said upper side, and holding plate being selected from a plurality of perforated holding plates of varying shape and having a nonplanar geometric upper surface conforming to the contour of a specimen to be held thereby for providing uniform retaining force along the surface of said specimen; and means connecting said base member chamber to a vacuum source whereby a specimen disposed on the upper side of said holding plate can be held to said perforated plate.